United States Patent [19]

Tanaka et al.

[11] Patent Number: 4,480,583

[45] Date of Patent: Nov. 6, 1984

[54] COATING APPARATUS

[75] Inventors: Yasunori Tanaka; Shinji Noda, both of Kanagawa, Japan

[73] Assignee: Fuji Photo Film Co., Ltd., Kanagawa, Japan

[21] Appl. No.: 447,375

[22] Filed: Dec. 6, 1982

[30] Foreign Application Priority Data

Dec. 16, 1981 [JP] Japan .............................. 56-201484

[51] Int. Cl.³ ............................................. B05C 5/02
[52] U.S. Cl. .................................... 118/410; 118/419
[58] Field of Search .............. 118/410, 413, 407, 411, 118/419

[56] References Cited

U.S. PATENT DOCUMENTS

| | | | |
|---|---|---|---|
| 2,464,771 | 3/1949 | Van Guelpen | 118/410 X |
| 2,774,327 | 12/1956 | Saint-Hilaire | 118/413 X |
| 4,299,186 | 11/1981 | Pipkin et al. | 118/410 X |
| 4,386,998 | 6/1983 | McIntyre et al. | 118/410 X |

Primary Examiner—John P. McIntosh

Attorney, Agent, or Firm—Sughrue, Mion, Zinn, Macpeak, and Seas

[57] ABSTRACT

An extrusion coating apparatus continuously extrudes a coating solution from a top portion of a slot and applies the same in the form of a coat on the surface of a flexible support which is continuously run along a back edge surface and a doctor edge surface of the apparatus. The apparatus is characterized in that the doctor edge has a triangular cross-section. In addition, assuming that the downstream end of the doctor edge is indicated by A, the vertex of the triangular cross-section is indicated by B, the outlet end of the slot is indicated C, the outlet end of the slot on the back edge surface is indicated by D, and the upstream end is indicated by E, the outlet end of the slot on the back edge surface D is disposed at a position which satisfies the following equation: $\angle ABC < \angle ABD < 180°$. Finally, the angle between the tangent line of the back edge surface at D and the line A–B is greater than that between the line B–D and the line A–B, and the back edge surface does not extend beyond the tangent line to the base surface.

14 Claims, 5 Drawing Figures

COATING APPARATUS

BACKGROUND OF THE INVENTION

1. Field of the Invention

The present invention relates to a coating apparatus and, more particularly, to an improved, extrusion-type coating apparatus having a doctor edge which enables a coating solution to be continuously extruded toward a surface of a running support so that a coating of uniform thickness is applied to the support.

2. Description of the Prior Art

The term "support", as used herein, means a flexible, beltlike material which generally has a width between 0.3 and 3.0 mm, a length between 45 and 20,000 mm, and a thickness between 2 and 20 $\mu$m—e.g., films made of plastics such as polyethylene terephthalate, polyethylene-2, 6-naphthalate, cellulose diacetate, cellulose triacetate, cellulose acetate propionate, polyvinyl chloride, polyvinyllidene chloride, polycarbonate, polyimide, and polyamide; paper; paper with polymers of $\alpha$-olefins containing from 2 to 10 carbon atoms such as polyethylene, polypropylene, and an ethylene-butene copolymer which is coated or laminated; and metallic foils of aluminum, copper, tin, etc. It also includes a belt-like material comprising the above-described belt-like material (as a substrate) provided with a preliminary processing layer.

The type of material chosen as the coating solution depends on the purpose for which the ultimate coated material is to be used, e.g., a photographic, light-sensitive coating solution; a magnetic coating solution; and a surface protecting, antistatic or lubricating coating solution. After the desired coating solution is coated onto a surface of the support, the support is dried and cut to the desired dimensions. Typical examples of such coated materials include photographic films, printing papers, and magnetic tapes.

Conventional, doctor edge-equipped extruders which are intended to apply a uniform coating of a coating solution on a support are described in Japanese Patent Application (OPI) No. 138036/75 (the term "OPI", as used herein, means a "published unexamined Japanese patent application") and Japanese Patent Publication No. 7306/79. In addition, a further, improved extruder is described in Japanese Patent Application No. 159899/80.

The common disadvantage of conventional, doctor edge-equipped extruders is that the range within which coating is possible is very limited. In particular, when coating at a rate of 100 to 150 m/min or more, it is very difficult to stably coat a coating solution which has a thickness of 20 $\mu$m or less in the form of a liquid using any of the conventional extruders.

Extensive investigations have revealed that the above-described problem which arises when using the conventional extruders is created as follows:

The running support is responsible for the introduction of air into the extruder portion. This phenomenon becomes more markedly abrupt at coating rates of 100 to 150 m/min or more. Therefore, in uniformly coating a thin film within the above range, it is important that the liquid pressure at the outlet of a slot be controlled appropriately. If the liquid pressure is low, a coating film which has an uneven thickness is formed by the introduction of air bubbles and/or scrubbing of the coating solution, i.e., the counterflow of the coating solution toward the upper stream. On the other hand, if the extruder produces only a high liquid pressure when the amount of the coating solution is small, the thickness in the widthwise direction of the resulting coating film is likely to become uneven.

SUMMARY OF THE INVENTION

An object of the present invention is to provide a coating apparatus which is free from the above-described defects of the conventional apparatuses and which permits high-speed coating and formation of a satisfactory thin, uniform coating layer.

The present invention relates to an extrusion-type coating apparatus in which a coating solution is continuously extruded from a top portion of a slot and coated on the surface of a flexible support. The flexible support is continuously run past a back edge surface and a doctor edge surface of the apparatus. A cross-section of the doctor edge is triangular. The apparatus is further constructed so that the following relationship is satisfied: $\angle ABC < \angle ABD < 180°$, where the downstream end of the doctor edge surface is indicated by A, a vertex of the triangular cross-section is indicated by B, the outlet end of the slot is indicated by C, the outlet end of the slot on the back edge surface is indicated by D, and the upstream end of the back edge is indicated by E. In addition, the upstream angle between the tangent line of the back edge surface at D and the line A—B, i.e., the angle facing in the upstream direction and formed between the tangent line L and an extension of the line A–B, is greater than the upstream angle between the line B–D and the line A–B, i.e., the angle facing in the upstream direction and having a value of $180° - \angle ABD$; also, the back edge surface does not extend beyond the tangent line to the base surface.

DESCRIPTION OF THE PREFERRED EMBODIMENTS

Figure 1:
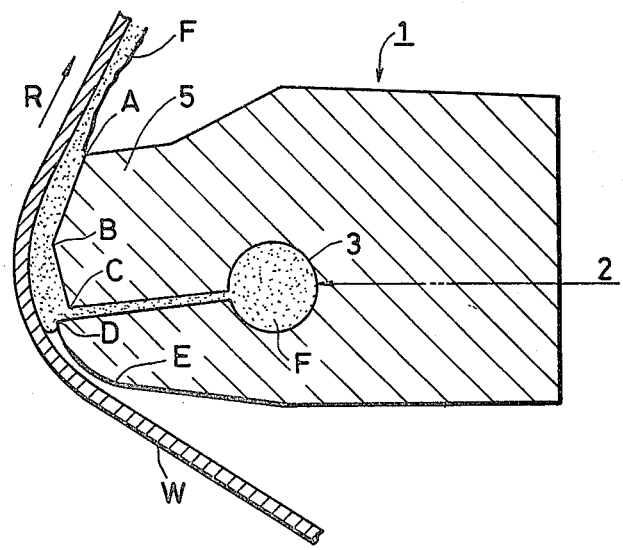
FIGS. 1 and 2 are each a cross-sectional view of an extruder of the apparatus of the present invention.

In the apparatus of the present invention shown in FIGS. 1, 2 and 3, a main portion of a doctor edge-equipped extruder 1 (hereinafter referred to as "extruder 1") can be divided into a coating solution-supplying portion 2, a pocket portion 3, a slot portion 4, a doctor edge portion 5, and a back edge portion 6.

(1) Coating Solution-Supplying Portion 2

The coating solution-supplying portion 2 comprises a liquid pumping means (not shown) which is positioned outside the body of the extruder 1 and which can continuously feed the above-described coating solution F at a predetermined flow rate to a pocket portion 3, which extends through the extruder 1 in the widthwise direction of the above-described support W, and piping materials which connect the pumping means to the pocket portion 3.

(2) Pocket Portion 3

Figure 2:
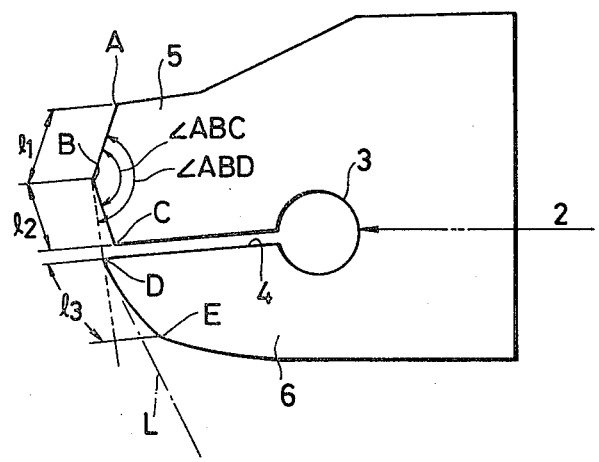
Figure 3:
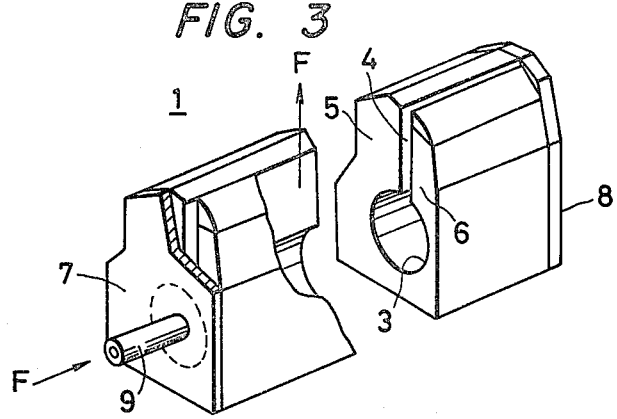
FIG. 3 is a partially cutaway perspective view of the extruder of FIGS. 1 and 2.

The pocket portion 3 is a type of reservoir which is almost circular in cross-section, as shown in FIGS. 1 and 2, and which extends in the widthwise direction of the above-described support W in almost the same cross-sectional form as shown in FIG. 3.

The effective extension length of the pocket portion 3 is usually designed so that it is equal to or slightly longer than the width along which the coating solution is to be coated on the support. Both opened ends of the extended pocket portion 3, as illustrated in FIG. 3, are closed by shield plates 7 and 8 which are to be fitted to both end portions of the extruder 1.

When the coating solution-supplying portion 2 is connected to a short pipe 9 which extends from the shield plate 7, the coating solution F is injected into the inside of the pocket portion 3. Thereafter, the coating solution F is extruded under pressure, at a uniform liquid pressure distribution, to the outside of the extruder through a slot portion 4, as described below.

(3) Slot Portion 4

The slot portion 4 is a relatively narrow flow path which extends through the body of the extruder 1 from the pocket portion 3 to the support W. The slot portion 4 usually has an open width e of from 0.03 to 2 mm and which extends in the widthwise direction of the support, as is the case in the pocket portion 3. The open length of the slot portion 4 in the widthwise direction of the support W is designed to be nearly equal to the coating width.

The length of the flow path, toward the support W in the slot portion 4, can be appropriately determined by taking into consideration the various conditions of the coating solution F (such as composition, physical properties, feed rate, and feed liquid pressure), as long as the coating solution F can flow out of the pocket portion 3 in the widthwise direction of the support W at a uniform flow rate and under a uniform liquid pressure distribution in a laminar flow.

The outlet end portion of the slot portion 4 is in contact with the doctor edge portion 5 at an end C, and it is in contact with the back edge portion 5 at an end D. The ends C and D are placed at the above-described positions, as defined in the present invention.

(4) Doctor Edge Portion 5 and Back Edge Portion 6

The doctor edge portion 5 is positioned at the downstream side of the support W from the outlet of the slot portion 4. If a downstream edge A and the upstream edge C of the doctor portion 5 are connected by a straight line, the area of the doctor edge surface, which extends from the line AC towards the support W, is triangular in cross-section and is defined by $\triangle ABC$ where B represents an edge between the upstream and downstream edges C, A, respectively. The angle $\angle ABC$ is an obtuse angle of at least 135°, and it is preferably designed within the range of from 150° to 175°. The edge surface length $l_1$, which is positioned at the downstream side of the vertex B, is designed within the range of from 0.5 to 15 mm (preferably from 1 to 10 mm). The edge surface length $l_2$, which is positioned at the upstream side of the vertex B, is designed within the range of from 0.1 to 5 mm (preferably from 0.1 to 2 mm).

The back edge portion also has an edge surface which faces the above-described support W. The length $l_3$ of the edge surface D-E of the back edge portion is set within the range of from 0.1 to 50 mm (preferably from 0.5 to 30 mm). The edge surface D-E is, preferably, a surface which does not have an inflection point. In addition to the curved surface shown in FIG. 2, it may also be a plane surface.

The front-most downstream edge D of the back edge portion extends beyond the front-most upstream edge C of the doctor edge portion, so that the angle $\angle ABC$ is less than the angle $\angle ABD$. Further, the upstream angle between the line A-B and line L tangent to the edge D, i.e., the angle facing in the upstream direction and formed between extensions of the lines A-B and L is greater than the upstream angle between the line A-B and the line B-D, i.e., the angle formed between those two lines facing in an upstream direction and having a value $180° - \angle ABD$.

The support W is set between running guide means, such as guide rollers, under a nearly constant tension so that the support W is slightly bendable in the thickness direction while it is brought in close vicinity of the apparatus of the present invention through an extruder supporting mechanism (not shown). Thus, it is curved and nearly parallel with the doctor edge portion 5 and the back edge portion 6. When the coating solution F is transported from the coating solution-supplying portion 2 at the desired flow rate, it is passed through the pocket portion 3 and the slot portion 4. Thereafter, it is extruded to the outlet top portion of the slot portion 4 at a flow rate and a pressure distribution which is uniform in the widthwise direction of the support W.

The coating solution F, thus extruded to the outlet top portion of the slot portion 4, develops a liquid pressure which is suitably controlled by designing the shape of the edge portion, as described above, thereby preventing the air entrained by the support W from coming into the coating solution and producing a small clearance between the surface of the support W and the edge portion. In this way, the coating solution flows along the surface of the support W as it is continuously transported in the direction indicated by R.

When the movement of the coating solution F is continuously maintained, the entire edge surface of the doctor edge portion 5 and the surface of the support W are completely separated from each other at a constant clearance by the coating solution F as it flows in a thin layer over the entire area of the support W in its widthwise direction.

The clearance between the entire surface of the doctor edge portion 5 and the support W is determined by factors such as the tension of the support W and the amount of the coating solution F being supplied. In particular, by changing only the amount of the coating solution F being supplied, the desired clearance (i.e., the thickness of a coating film) can be produced very easily and accurately.

When cemented carbides are employed in the doctor edge portion 5 and the back edge portion 6, and the straightness and the flatness of the surfaces of the two edge portions are more accurate, the clearance in the widthwise direction becomes more uniform. This further improves the uniformity of the thickness of the coating film in the widthwise direction, and it also improves high-speed and thin layer coating properties.

Figure 4:
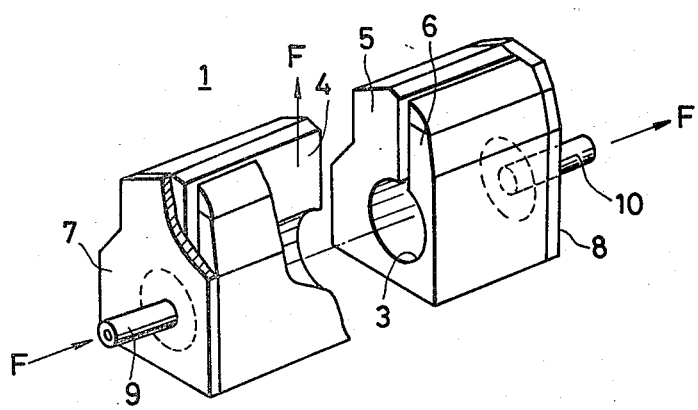
FIG. 4 is a perspective view of a modified extruder of the apparatus of the present invention in which the coating solution-supplying system is changed.
Figure 5:
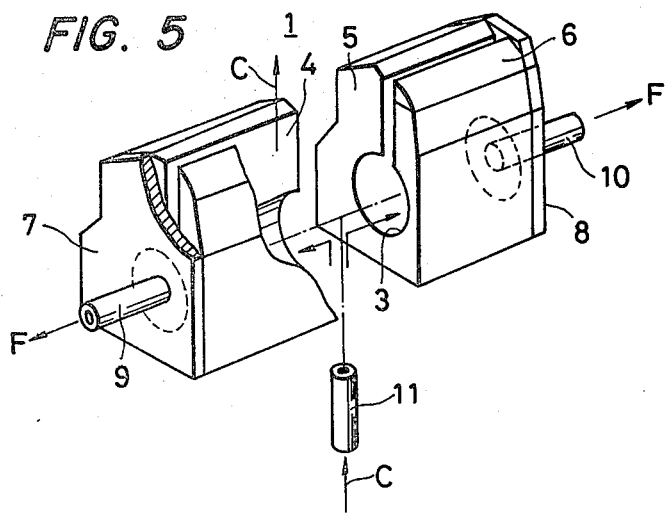
FIG. 5 is a perspective view of another modified extruder of the apparatus of the present invention in which the coating solution-supplying system is changed.

FIGS. 4 and 5 each show a modified method of feeding the coating solution F to the pocket portion 3. In accordance with the feeding method shown in FIG. 4, the coating solution is supplied from one side, as is the case with the method shown in FIG. 3, and a short pipe 10 is fitted to the shield plate 8 so that a portion of the coating solution F, which is introduced into the inside of the pocket portion 3 through the short pipe 9 which is fitted to the shield plate 7, can be withdrawn through the short pipe 10. In this way, it is possible to prevent the coating solution F from remaining in the pocket portion 3 over an extended period of time. Therefore, this is a very useful means for handling a magnetic coating solution which has thixotropy and which is likely to coagulate.

FIG. 5 illustrates a central feeding method in which, in addition to the short pipes 9 and 10 fitted at the ends as in FIG. 4, an additional short pipe 11 extends to the pocket portion 3 at a nearly central point. The coating solution F is supplied into the pocket portion 3 through the short pipe 11.

A portion of the coating solution F, which is introduced into the inside of the pocket portion 3, is discharged out of the system through the short pipes 9 and 10 which are fitted at the ends, and the remaining coating solution F is extruded through the slot portion 4 at a further, improved pressure distribution.

Coating solution-feeding methods which can be used for the apparatus of the present invention are not limited to those illustrated in FIGS. 3–5 because these methods can be employed in combination with each other. The pocket portion 3 is not limited to the cylindrical form described above, and it may be modified to various forms such as a square form and a ship bottom-like form. In brief, it is sufficient for the pocket portion 3 to be in a form which enables one to produce a uniform liquid pressure distribution in the widthwise direction.

The apparatus of the present invention, in which the doctor edge portion 5 and the back edge portion 6 of the extruder 1 are designed as described in the appended claims, offers the following novel advantages:

(1) High speed-coating properties are greatly improved.

(2) Thin layer coating properties are improved; therefore, it is possible to uniformly coat a coating solution in a liquid form even in a thickness as small as 10 μm.

(3) The liquid pressure at the outlet top portion of the slot portion 4 can be controlled at will; therefore, it is possible to prevent the support from contacting the edge portion, and it is also possible to prevent both the support and edge portion from being scratched by any undesired contact between each other.

(4) Because the liquid pressure can be controlled at will, as described above, it is possible to coat the coating solution over a wide viscosity range.

Furthermore, by using cemented carbides to fabricate the edge portions, the above-described effects can be further increased, and it is also possible to prevent the deterioration of the original performance due to the wear of the edge portion which arises in coating the magnetic tape coating solution.

The following example is given to illustrate the present invention in more detail.

EXAMPLE

The ingredients shown in Table 1 were placed in a ball mill and fully mixed to disperse them, and 30 parts by weight of an epoxy resin (epoxy equivalent, 500) was added to the above-prepared dispersion to prepare a magnetic coating solution.

TABLE 1

| | parts by weight |
|---|---|
| α-Fe2O3 powder (needle-like grains having a mean grain size in long | 300 |

TABLE 1-continued

| | parts by weight |
|---|---|
| axis direction of 0.5μ; coercive force: 320 oersted) | |
| Vinyl chloride-vinyl acetate copolymer (copolymerization ratio: 87:13; degree of polymerization: 400) | 30 |
| Electrically conductive carbon | 20 |
| Polyamide resin (amine value: 300) | |
| Lecithin | 6 |
| Silicone oil (dimethyl polysiloxane) | 3 |
| Xylene | 300 |
| Methyl isobutyl ketone | 300 |
| n-Butanol | 100 |

The equilibrium viscosity of the above-prepared magnetic coating solution was measured by Shimazu Reometer RM-1 (produced by Shimazu Seisaku Jo) and found to be 8 poise at a shearing rate of 10 sec-1 and 1 poise at a shearing rate of tpp sec-1.

The magnetic coating solution was coated, using the coating apparatus shown in FIGS. 1 to 3, under the following conditions:

1. Support
   Material . . . polyethylene terphthalate film
   Thickness . . . 20 μm
   Width . . . 300 mm
   Tension . . . 2 kg/entire width and 4 kg/entire width
   Rate of movement . . . 100 m/min, 150 m/min, 200 m/min, 300 m/min 2. Extruder
   No. 1 . . . Apparatus of the present invention
   No. 2 . . . Apparatus described in Japanese Patent Application No. 159899/80

3. Coating thickness (liquid form): 10 μm, 20 μm, 50 μm

The results are shown in Table 2.

TABLE 2

| Coating Rate (m/min) | Extruder No. 1 Coating Thickness (μm) | | | Extruder No. 2 Coating Thickness (μm) | | |
|---|---|---|---|---|---|---|
| | 10 | 20 | 50 | 10 | 20 | 50 |
| 100 | A | A | A | B | A | A |
| 150 | A | A | A | B | B | C |
| 200 | A | A | A | C | C | C |
| 300 | A | A | A | C | C | C |

A — Coating can be well performed.
B — Good coating results can be obtained, but reproducibility is poor.
C — Uniform coating cannot be achieved.

It can be seen from Table 2 that the use of the apparatus of the present invention results in improved, high-speed coating properties and thin film-coating properties.

What is claimed is:

1. An extrusion coating apparatus having front-most surfaces disposed closest to a flexible support (W), comprising:
   a coating source (3);
   a doctor edge surface (5) and a back edge surface (6) each of which confronts said flexible support which is continuously transported in a vicinity of said surfaces, said doctor edge surface being disposed on a downstream side of a longitudinal slot (4) and said back edge surface being disposed on an upstream side of said longitudinal slot, said longitudinal slot extending along a widthwise direction of said support and being in communication with said coating source, said doctor edge surface having a front-most downstream edge A, a front-most upstream edge C and a front-most intermediate edge B disposed between said downstream and upstream edges, said upstream, downstream and intermediate edges extending along said widthwise direction of said support;

said back edge surface having a front-most downstream edge D and a front-most upstream edge E which also extends along said widthwise direction of said support;

said doctor edge surface and said back edge surface being formed such that in cross-section an angle ∠ABC is less than an angle ∠ABD which is less than 180°, and an upstream angle between a line A-B and a tangent line which is tangent to said front-most downstream edge D of said back edge surface being greater than an upstream angle between a line B-D and said line A-B.

2. The apparatus as claimed in claim 1, wherein said back edge surface is disposed entirely behind said tangent line.

3. The apparatus as claimed in claim 2, wherein said back edge surface is planar.

4. The apparatus as claimed in claim 2, wherein said back edge surface is curved.

5. The apparatus as claimed in claim 2, wherein said doctor edge surface and said back edge surface are made of cemented carbides.

6. The apparatus as claimed in claim 1, wherein said angle ∠ABC is greater than 150° but less than 175°.

7. The apparatus as claimed in claim 6, wherein said line A-B is between 0.5 and 15 mm, a line B-C is between 0.1 and 5 mm, and a line D-E is between 0.1 and 50 mm.

8. The apparatus as claimed in claim 6, wherein said line A-B is between 1.0 and 10 mm, a line B-C is between 0.1 and 2 mm, and a line D-E is between 0.5 and 30 mm.

9. The apparatus as claimed in claim 6, wherein said slot has an opening between 0.03 and 2.0 mm along a direction traverse to said widthwise direction.

10. The apparatus as claimed in claim 6, further comprising means for feeding a coating solution to said coating source, said coating source comprising a longitudinal reservoir which extends along said widthwise direction of said support.

11. The apparatus as claimed in claim 10, wherein said feeding means comprises a pipe which extends through the one side wall of said reservoir for feeding said coating solution into said reservoir.

12. The apparatus as claimed in claim 11, wherein said feeding means includes a second pipe which extends from an opposite side wall of said reservoir for discharging excess coating solution from said reservoir.

13. The apparatus as claimed in claim 10, wherein said feeding means includes a first pipe disposed at a central point of said reservoir for feeding said coating solution into said reservoir, and further includes second and third pipes which extend from opposite side walls of said reservoir for discharging excess coating solution from said reservoir.

14. The apparatus as claimed in claim 1, wherein said doctor edge surface and said back edge surface are made of cemented carbides.

* * * * *